Jan. 20, 1953

R. W. WAMPLER ET AL 2,625,717

MULTIPLE SHEET GLAZING UNIT

Filed June 12, 1945

Inventors
ROY W. WAMPLER,
CHARLES M. BROWNE.

By Frank Fraser
Attorney

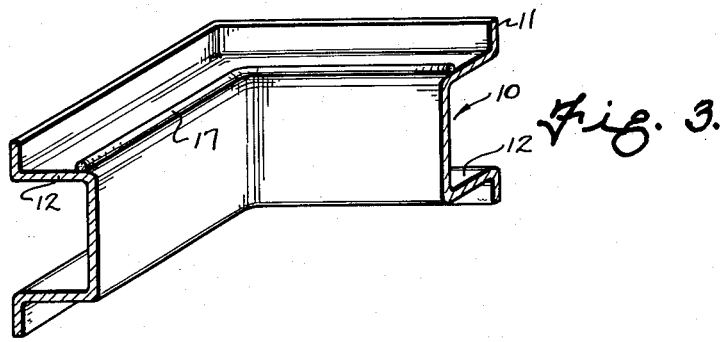
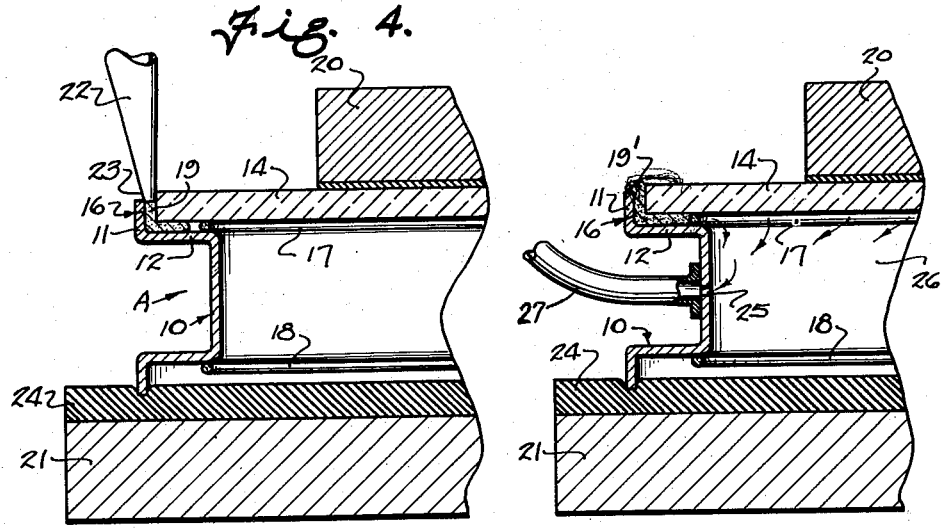
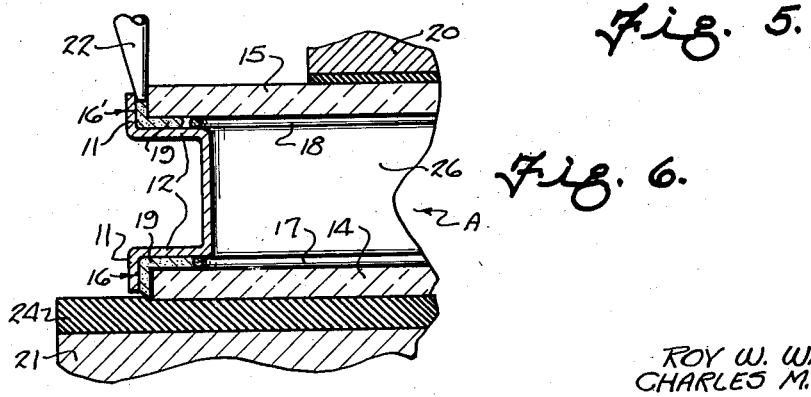

Patented Jan. 20, 1953

2,625,717

UNITED STATES PATENT OFFICE 2,625,717

MULTIPLE SHEET GLAZING UNIT

Roy W. Wampler and Charles M. Browne, Toledo, Ohio, assignors to Libbey-Owens-Ford Glass Company, Toledo, Ohio, a corporation of Ohio Application June 12, 1945, Serial No. 599,100

10 Claims. (Cl. 20—56.5)

The present invention relates to multiple sheet glazing units, and more particularly to a novel unit of this general character that is especially adapted for glazing oven doors and similar high temperature installations.

Briefly stated, the unit of the invention is made up of two or more transparent panels permanently mounted in spaced face to face relation by cementing them to a frame.

In the preferred form the spaced sheets or panels are of tempered glass and the frame is a porcelain enameled one of the peripheral type. The inside margins of each of the glass sheets are spaced from the enameled frame by a spacer strip or cord of glass fibers, and the space thus formed between the glass sheets and the frame is filled with a special silica base cement.

An important object of the invention is the provision of a multiple glass sheet unit of the general character outlined above that can be used to glaze ovens, lehrs, furnaces and the like; that will cut down on the loss of heat through the openings so glazed; and that will substantially eliminate the condensation of moisture on the glass in the openings.

Another object is the provision in such a unit of a tight, permanent joint between the glass and frame that will remain stable at temperatures up to the limits that can be endured by the glass itself.

A further object is the provision of a cement joint or seal between the glass and frame that is capable of withstanding the strains set up when temperatures of the order referred to above are repeatedly built up on one side of the unit while ordinary room temperatures are maintained on the other side.

Other objects and advantages of the invention will become more apparent during the course of the following description, when taken in connection with the accompanying drawings.

In the drawings, wherein like numerals are employed to designate like parts throughout the same:

Fig. 3 is a perspective view of one corner of the frame in which the glass sheets are to be mounted, showing one of the glass fiber spacer strips secured thereto;

Fig. 4 is a fragmentary view of the frame, with one glass sheet in place, mounted in a clamping apparatus to facilitate introduction of cement between the glass and frame;

Fig. 5 is a view similar to Fig. 4 showing the withdrawing of air from inside the unit to cause the cement to completely fill the space into which it has been introduced; and Fig. 6 is a view similar to Fig. 4 but with the frame reversed and the second glass sheet in position to receive cement between itself and the frame.

Figure 1:
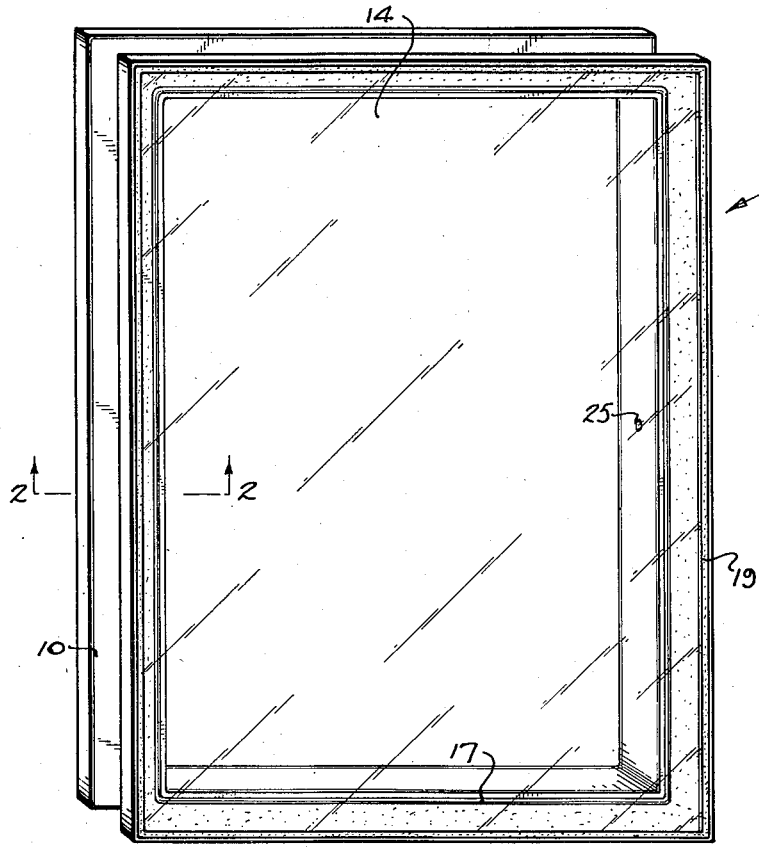
Fig. 1 is an isometric view of a multiple glass sheet glazing unit constructed in accordance with the invention.
Figure 2:
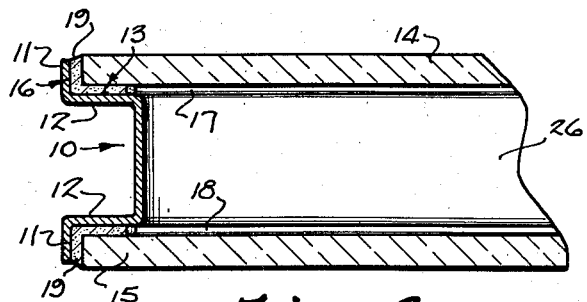
Fig. 2 is a fragmentary sectional view taken substantially on the line 2—2 in Fig. 1.

As pointed out above the units of this invention are suitable for many different types of high temperature installations. However, for the purpose of illustration, the unit A shown in the drawings is one that is especially designed for glazing oven doors in kitchen stoves.

As pictured, this unit comprises an enameled metal frame 10 of substantially U shape in cross section and provided with flanges 11 extending laterally from the outer ends of the legs 12 of the U. The frame is generally rectangular in shape and the legs 12, together with the flanges 11, form a sort of glass sheet receiving shelf or channel 13. Glass sheets 14 and 15 are cut to fit within the channels 13 but are made enough shorter to provide a space 16 between the edge of the glass and the flange 11 on all four sides. The inside marginal portions of the sheets 14 and 15 are also spaced slightly from the legs 12 of the frame by loops of fiber glass cord 17 and 18 that run around the legs 12 at a point remote from the flanges 11. The space 16 so formed, and which is defined by the flanges 11 and legs 12 of the frame on one side, by the edges and margins of the glass sheet on the other and by the fiber glass cord on the third, holds a body of cement 19 which permanently secures the glass sheets in the frame 10.

In making this unit it is necessary to choose a cement that will produce a tight and permanent joint between the frame and the glass and, where the unit is to be used in high temperature installations, the cement should also be heat resistant. We prefer a silica base cement, and especially one comprising essentially quartz, Portland cement and water glass, because we have found that this type will have characteristics that closely resemble those of the glass sheets themselves. One silica base cement that has given excellent results is sold by the Pennsylvania Salt Company under the trade-name "Penchlor." When this material, which comes in powder form, is mixed with sodium silicate to bring it to the desired consistency a cement that is very satisfactory for the present purpose results.

Silica base cements that comprise essentially quartz, Portland cement and water glass are quick-setting and self-hardening and adhere to a variety of different kinds of surfaces. For example, they adhere very well to brick, glass, wood, metal and so forth. For this reason, the frame 10 may be made from any one of a number of materials so long as they possess the desired degree of impermeability to air and water vapor, and will stand up under the temperatures encountered.

We prefer a metal frame, and specifically a porcelain enameled iron frame. The porcelain enamel serves a twofold purpose. It matches or complements the finish on most stoves, and a silica base cement will adhere to porcelain even better than it does to uncoated metal or other materials.

After selecting a frame of the desired size, shape and composition, the glass fiber spacer cord 17 is secured to the leg 12 of the frame, adjacent its inner end, in the manner shown in Fig. 3. An easy way of doing this is to stick the spacer strip to the frame with sodium silicate. In actual practice we position the glass cord 17 on the frame by means of a simple wooden template (not shown) and then brush a layer of sodium silicate over the cord. The template can then be removed and the sodium silicate will hold the cord in place so that the frame can be turned over and the process repeated to secure the cord 18 to the other side.

The next move is to cement the glass sheets into the frame. Because the setting rate of the silica base cement is influenced by temperature, it is desirable to cool both the frame and the glass before cementing. This allows a longer time during which the cement can be worked and facilitates its extrusion into a narrow space between the glass and frame. The actual application of the cement can be carried out in a number of ways. For example, by means of the clamping apparatus indicated diagrammatically in Figs. 4, 5 and 6. This apparatus includes a pair of oppositely disposed, rubber faced, clamping members or plates 20 and 21 between which the assembled or partially assembled unit A can be tightly held. The clamping members 20 and 21 are preferably urged toward one another by spring pressure, and may be mounted on rotatable spindles to permit the clamping means and the unit held therebetween to be freely rotated.

The first step in assembling the unit A is to place the glass sheet 14 in the frame with its lower surface supported on the spacer cord 17. The glass sheet is cut enough smaller than the opening in the frame 10 that when arranged centrally thereof a space will be left between the edge of the glass sheet and the flange 11 entirely around the unit. This space is a continuation of the space formed between the lower margin of the glass plate 14 and the leg 12 of the frame, and which is closed at its inner side by the glass cord 17, the whole thing being designated 16.

To cement this first glass sheet into the frame 10 the partially assembled unit is arranged between the clamping member 20 and 21 and clamped securely therebetween (Fig. 4). Cement 19 in a sufficiently fluid state is then forced into the space 16. The cement may be forced through a hoze and nozzle arrangement by compressed air if desired, but good results have been obtained by the use of a pastry tube type of extruding device 22. In the absence of any special equipment designed for the purpose, a rolled cone of heavy paper will give satisfactory results. An opening is provided at the small end 23 of the cone and, after the cement has been introduced into the large end, the paper of the cone can be progressively rolled and squeezed to force the cement out of the opposite end and into the space between the glass and frame.

We have found that by making the opening 16 of the proper size, and using cement at the proper viscosity, the opening can be completely filled by the extrusion process. The best working consistency is attained when 1.6 parts of a powder, containing roughly 85 to 95% quartz and 5 to 15% Portland cement, is mixed with one part of sodium silicate or water glass. The specific type of sodium silicate used has a specific gravity of 1.355 and a Bé. of 38° and has a composition of 1 part sodium oxide to 3.20 to 3.25 parts of $SiO_2$. This produces a cement of such fluidity that it will flow readily into an opening approximately $\frac{1}{16}$ to $\frac{3}{32}$ inch wide.

However, in situations where it is required to use a narrower opening, or heavier cements, or, if it is desired to make sure that all parts of the space is completely filled, the procedure illustrated in Fig. 5 can be followed. That is, suction may be applied by exhausting air from within the unit to draw the soft cement in the space 16 down into full contact with the spacer 17. For this purpose, it will be noted that the lower pressing element 21 extends outwardly beyond the edge of the unit A and that the rubber facing 24 on the element is relatively thick and highly resilient. Consequently, the rubber facing 24 will seal the lower part of the unit and, since the space between the frame and the glass plate 14 on the upper part of the unit contains the cement 19, the unit will be practically air tight. Consequently, when air is exhausted through a vent hole 25 in the frame 10, through a hose 27 leading to an air exhauster (not shown), the cord 17 will be sufficiently permeable to allow suction to be applied to the cement 19 therebeyond, but will act to stop the cement when it comes tightly thereagainst, and prevent it from leaking into the air space 26 of the unit.

It is preferred that any surplus cement, such as is indicated at 19' in Fig. 5, be left on the unit until it has dried and set, after which it can be ground off on an abrasive wheel or belt. Although the flanges 11 are here shown as terminating short of the outside face of the glass sheet they can of course be made long enough to provide a flush mounting if desired.

Upon completion of the step of cementing the glass sheet 14 into the frame 10, the unit is turned over, the glass sheet 15 is properly positioned on the spacer 18, and the completely assembled unit is then clamped between the members 21 and 22 as shown in Fig. 6. The cementing steps described above are then repeated to fill the space 16' between the glass sheet 15 and the frame.

After both the glass sheets have been cemented into the frame it is advisable to allow the unit to air dry from two to twenty-four hours before subjecting it to other than careful handling. Following the drying period the unit should be conditioned before installing it in the oven door. This conditioning is primarily for the purpose of removing all residual moisture from the unit, and especially from the cement 19, that might otherwise condense on the inside of the glass sheets during use; and it consists in passing dry air through the unit at elevated temperatures. One satisfactory way of doing this is to place the unit in an oven at about 250 degrees Fahrenheit and at the same time to pass dry heated air through the air space 26 by way of the vent hole 25 until all moisture has been removed from the cement.

The vent hole 25 is left in the unit when it is installed to provide a breather opening and to avoid the building up of excessive pressures in the unit during use. To prevent the leakage of dirt and excessive water vapor through this breather hole, it may be covered with a filter material such as glass cloth.

Units produced and conditioned in the manner described above have proved very satisfactory in the glazing of domestic oven doors, and have successfully withstood tests that are considered the equivalent of more than twelve months actual service under normal conditions. For example, ovens glazed with these units were repeatedly heated to temperatures of 600 degrees Fahrenheit (broiling temperature) for two hours and then permitted to cool down to room temperature. After one hundred such cycles the joint between the glass and frames in the tested units was still tight.

During the tests, pans of water were evaporated in the oven during the heating period, and on one occasion one of the stoves was completely enclosed and water boiled within the enclosure to to thoroughly saturate the atmosphere. Nevertheless, no condensation was observed on the inside of the glass sheets at any time before, during or after the 100 cycles.

In order to test the bond between the glass and cement, and also the glass to enamel bond, one of the units was broken after having completed the tests. The bond of the cement to the glass and also of the cement to the enamel proved to be excellent. In fact, when the glass finally pulled from the frame, under continued strain, it did so by breaking down of the enamel. In other words, the adhesion of the cement to the glass and to the enamel exceeded the cohesive properties of the enamel itself.

The fact that tempered glass is used in glazing these units enables them to readily withstand broiling temperatures, which are the maximum encountered in kitchen stoves. Such tempered glass is more than three times as resistant to thermal shock as is ordinary glass and endures temperatures up to 550 to 650 degrees Fahrenheit on one surface, and ordinary room temperatures on the other, without breaking. Nevertheless the silica base cement described above, and its bond to the metal and to the glass, are at least as heat resistant as is the glass itself.

It is to be understood that the form of the invention herewith shown and described is to be taken as a preferred embodiment of the same, and that various changes in the shape, size and arrangement of parts may be resorted to without departing from the spirit of the invention or the scope of the subjoined claims. For instance, the frame and spacer arrangement may be used with different kinds of cements; and the silica base cement can be used to secure glass sheets into other types of frames, either with or without spacer strips.

We claim:

1. A multiple sheet glazing unit, including two sheets of tempered glass, a porcelain enameled frame substantially U shape in cross section supporting said sheets in spaced face to face relation, said frame having a vent hole to avoid the building up of excessive pressures in the unit during use, and a cement comprising approximately 1.6 parts of a powder containing from 85 to 95 parts quartz and from 5 to 15 parts Portland cement to approximately one part sodium silicate bonding said sheets to said frame.

2. A multiple sheet glazing unit, including two transparent panels, a frame maintaining said panels in spaced face to face relation, said frame being provided with a vent hole to avoid the building up of excessive pressures in the unit during use and having flanges extending over the edges of said panels and terminating substantially flush with the outer faces thereof, a spacer strip between one of the panels and the frame, and cement in the space walled on three sides by said panel, frame and spacer strip.

3. A multiple sheet glazing unit, including two sheets of glass, a metal frame maintaining said sheets in spaced face to face relation, said frame being provided with a vent hole to avoid the building up of excessive pressures in the unit during use, a spacer strip lying inwardly of the edges of one of the glass sheets and between said sheet and said frame, and a silica base cement filling the space enclosed on one side by the glass sheet, on another by the frame and on a third by said spacer strip.

4. A multiple sheet glazing unit, including two sheets of glass, a porcelain enameled frame maintaining said sheets in spaced face to face relation, said frame being provided with a vent hole to avoid the building up of excessive pressures in the unit during use, a spacer lying inwardly of the edges of one of the glass sheets between said sheet and the frame, and a cement comprising silica, a cementitious binding agent and sodium silicate in the space enclosed on three sides by said glass sheet, frame and spacer.

5. A multiple sheet glazing unit, including two transparent panels, a frame maintaining said panels in spaced face to face relation, said frame being provided with a vent hole to avoid the building up of excessive pressures in the unit during use, a twisted glass fiber spacing strip secured between said panels and the frame, and means for securing the transparent panels and frame together.

6. A multiple sheet glazing unit, including two sheets of glass, a porcelain enameled frame maintaining said sheets in spaced face to face relation, said frame having a vent hole to avoid the building up of excessive pressures in the unit during use, a glass fiber spacing strip between one of said glass sheets and said frame, and a silica base cement in the space defined on three sides by said glass sheet, the frame, and the glass fiber spacing strip.

7. A multiple sheet glazing unit, including two sheets of tempered glass, a porcelain enameled frame mounting said sheets in spaced face to face relation, said frame having a vent hole to avoid the building up of excessive pressures in the unit during use, a spacer strip of glass fibers between the inner marginal face of one of said glass sheets and the frame, and a cement comprising silica, a cementitious binding agent and sodium silicate in the space between said glass sheet and the frame that is bounded on a third side by the spacer strip.

8. A multiple sheet glazing unit, including a porcelain enameled metal frame substantially U shape in cross section, said frame having a vent hole therethrough to avoid the building up of excessive pressures in the unit during use, cords of twisted glass fibers on opposite sides of and running around said frame inwardly of the lateral flanges thereon, a pair of tempered glass sheets within said frame and mounted in spaced face to face relation thereby and spaced therefrom by said cords, and a silica base cement filling the spaces between the glass sheets and the frame that are bounded on their inner sides by the glass fiber cords.

9. A multiple glass sheet glazing unit for oven doors and similar high temperature installations comprising, two sheets of tempered glass, a porcelain enameled frame substantially U-shaped in cross-section supporting said sheets in spaced face to face relation, said frame including spaced legs disposed between the glass sheets and being provided with flanges extending over the edges of said glass sheets and terminating substantially flush with the outer faces thereof, spacer strips arranged between the legs of the frame and the glass sheets inwardly of the outer edges of said sheets to space the said sheets from the said frame, said flanges being also spaced from the edges of the glass sheets, and a silica base cement filling the spaces between the legs of the frame and the adjacent faces of the glass sheets and also the spaces between the edges of the glass sheets and the flanges of the frame.

10. A multiple glass sheet glazing unit for oven doors and similar installations in accordance with claim 9, in which a vent hole is provided in said frame to avoid the building up of excessive pressures in the unit during use.

ROY W. WAMPLER.
CHARLES M. BROWNE.

REFERENCES CITED

The following references are of record in the file of this patent:

UNITED STATES PATENTS

| Number | Name | Date |
|---|---|---|
| 379,580 | Jurschina | Mar. 20, 1888 |
| 485,810 | Curtis | Nov. 8, 1892 |
| 1,982,351 | Phillips | Nov. 27, 1934 |
| 2,029,218 | Biesik | Jan. 28, 1936 |
| 2,030,869 | Haven | Feb. 18, 1936 |
| 2,097,073 | Long | Oct. 26, 1937 |
| 2,138,164 | Haven | Nov. 29, 1938 |
| 2,150,355 | Biggers | Mar. 14, 1939 |
| 2,173,664 | Shutts | Sept. 19, 1939 |
| 2,282,831 | Shutts | May 12, 1942 |
| 2,303,125 | Knight | Nov. 24, 1942 |

FOREIGN PATENTS

| Number | Country | Date |
|---|---|---|
| 787,391 | France | 1935 |